US009356683B2

(12) United States Patent
Yu et al.

(10) Patent No.: US 9,356,683 B2
(45) Date of Patent: May 31, 2016

(54) APPARATUS AND METHOD FOR SCHEDULING IN A RELAY SYSTEM

(75) Inventors: Tak-Ki Yu, Yongin-si (KR); Seung-Hee Han, Hwaseong-si (KR); Yung-Soo Kim, Seongnam-si (KR); Sung-Yoon Jung, Seoul (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 12/557,944

(22) Filed: Sep. 11, 2009

(65) Prior Publication Data

US 2010/0142415 A1    Jun. 10, 2010

(30) Foreign Application Priority Data

Sep. 12, 2008    (KR) .................. 10-2008-0090530

(51) Int. Cl.
*H04B 7/14*    (2006.01)
*H04B 7/155*    (2006.01)
*H04W 72/12*    (2009.01)
*H04W 84/04*    (2009.01)

(52) U.S. Cl.
CPC ....... *H04B 7/15578* (2013.01); *H04W 72/1226* (2013.01); *H04W 84/047* (2013.01); *Y02B 60/50* (2013.01)

(58) Field of Classification Search
CPC .............................. H04W 16/14; H04W 72/04
USPC .................................................. 370/310–350
See application file for complete search history.

(56) References Cited

U.S. PATENT DOCUMENTS

| | | | | |
|---|---|---|---|---|
| 7,430,397 B2* | 9/2008 | Suda | .................. | H04B 7/15564 343/725 |
| 2006/0094364 A1* | 5/2006 | Hirota | ..................... | H04B 15/02 455/66.1 |
| 2007/0081502 A1 | 4/2007 | Lee et al. | | |
| 2007/0109989 A1* | 5/2007 | Nakagawa | ............. | H04W 84/20 370/328 |
| 2007/0264932 A1 | 11/2007 | Suh et al. | | |
| 2007/0270113 A1 | 11/2007 | Oh et al. | | |
| 2008/0070582 A1 | 3/2008 | Cai | | |
| 2008/0095037 A1 | 4/2008 | Chang et al. | | |
| 2008/0165063 A1* | 7/2008 | Schlub | .................... | H01Q 1/243 343/702 |
| 2008/0212703 A1 | 9/2008 | Han et al. | | |
| 2010/0099451 A1* | 4/2010 | Saban et al. | ................... | 455/502 |
| 2010/0136989 A1* | 6/2010 | Westerberg | ........... | H04W 16/14 455/450 |

FOREIGN PATENT DOCUMENTS

| | | |
|---|---|---|
| KR | 1020070112701 | 11/2007 |
| WO | WO 2008/015562 | 2/2008 |

* cited by examiner

*Primary Examiner* — Wanda Z Russell
(74) *Attorney, Agent, or Firm* — The Farrell Law Firm, P.C.

(57) ABSTRACT

An apparatus and a method for scheduling and a power control of a relay system that is capable of stable operation an environment where sufficient isolation between antennas is not ensured. The apparatus includes a scheduler for allocating resources to a zone not experiencing inter-antenna interference in an initial resource allocation, classifying users based on vulnerability to the interference, and allocating resources to a zone experiencing the interference, and a power controller for setting the resources of the zone experiencing the interference to a lower power than the resources of the zone not experiencing the interference to minimize the inter-antenna interference.

14 Claims, 17 Drawing Sheets

APPARATUS AND METHOD FOR SCHEDULING IN A RELAY SYSTEM

PRIORITY

This application claims priority under 35 U.S.C. §119(a) to a Korean Patent Application filed in the Korean Intellectual Property Office on Sep. 12, 2008, and assigned Serial No. 10-2008-0090530, the entire disclosure of which is incorporated herein by reference.

BACKGROUND OF THE INVENTION

1. Field of the Invention

The present invention relates generally to an apparatus and a method for scheduling in a full duplex relay system. More particularly, the present invention relates to scheduling and power control of a relay system, which is capable of stable operation even when sufficient isolation between antennas is not ensured.

2. Description of the Related Art

Coverage holes are caused by regional characteristics such as mountains, trees, and buildings within cells of a mobile communication system.

In order to address these coverage holes, repeaters are installed within the mobile communication system to provide continuous service in these troubled areas within the cells. However, a repeater often degrades the performance in noise amplification.

A relay system, which decodes and forwards a signal from a Base Station (BS), instead of simply amplifying the signal, has been proposed as an improvement over the conventional repeater. This type of improved relay system is being extensively researched to provide the coverage extension and throughput enhancement of a cellular mobile communication system. Specifically, the IEEE 802.16j is standardizing a relay system for practical use, wherein in comparison with a conventional single-hop system, the use of the improved relay system improves performance while reducing deployment and maintenance costs.

Relay schemes may generally be classified into two types: (i) a relay scheme performing only one of transmission or reception using one antenna set, and (ii) a relay scheme simultaneously performing transmission and reception using two antenna sets. The former scheme is referred to as a half duplex relay and the latter scheme is referred to as a full duplex relay.

FIG. 1 is a block diagram of a conventional full duplex relay system, which enables simultaneous communication with an upper node and a lower node using two antenna sets.

Referring to FIG. 1, the full duplex relay system includes a radio transmitter 155, a radio receiver 110, converters 115 and 150 for Analog-to-Digital conversion and Digital-to-Analog conversion, respectively, transmission and reception modems 130 and 120 for modulating and demodulating the signal, a data buffer 125 for temporarily storing data in the data processing, an interference signal controller 135 for controlling interference in the baseband, a delay converter 140 for rejecting interference in the radio band, a size converter 145, and a coupler 160.

The radio transmitter and receiver 155 and 110, the converters 150 and 115, and the transmission and reception modems 130 and 120 may be referred to merely as the transmitter and the receiver, respectively.

When the relay system of FIG. 1 simultaneously transmits and receives over the two antennas by reusing all resources, interference between the antennas is caused. However, this interference relates to the two antennas in the same relay. Therefore the relay system is aware of the transmit signal and can cancel the interference from the signal of the receive antenna. However, for the interference cancellation algorithm, a Signal to inter-antenna Interference Ratio (SIR) basically needs to stay over a certain level. For this reason, the full duplex relay system is installed only in environments where the sufficient isolation between the antennas is ensured.

SUMMARY OF THE INVENTION

The present invention is designed to address at least the above-mentioned problems and/or disadvantages and to provide at least the advantages described below.

Accordingly, an aspect of the present invention is to provide a scheduling apparatus and method for stable operation in an environment where sufficient isolation or a sufficient Signal to inter-antenna Interference Ratio (SIR) is not ensured between antennas in a relay system.

Another aspect of the present invention is to provide an apparatus and a method for allocating resources to a zone that does not experience inter-antenna interference in a scheduling process, and for allocating resources to a zone that does experience inter-antenna interference in an additional resource allocation in a relay system.

Another aspect of the present invention is to provide an apparatus and a method for controlling power in a relay system to minimize interference when resources are allocated to a zone that experiences inter-antenna interference.

In accordance with an aspect of the present invention, an apparatus for resource allocation in a relay system includes a scheduler for allocating resources to a zone that does not experience inter-antenna interference in the resource allocation based on a priority.

In accordance with another aspect of the present invention, a method for resource allocation in a relay system includes allocating resources to a zone that does not experience inter-antenna interference in the resource allocation based on a priority.

Other aspects, advantages, and salient features of the present invention will become apparent to those skilled in the art from the following detailed description, which, taken in conjunction with the annexed drawings, discloses certain embodiments of the invention.

BRIEF DESCRIPTION OF THE DRAWINGS

The above and other aspects, features, and advantages of certain embodiments the present invention will become more apparent from the following detailed description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

With reference to the accompanying drawings, the following description is provided to assist in a comprehensive understanding of certain embodiments of the present invention. It includes various specific details to assist in that understanding, but these are to be regarded as merely exemplary. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

The embodiments of the present invention provide a scheduling apparatus and method of a full duplex relay system. More particularly, the embodiments of present invention provide scheduling and power control for a relay system, which stably operates in an environment where sufficient isolation between antennas is not ensured.

Figure 1:
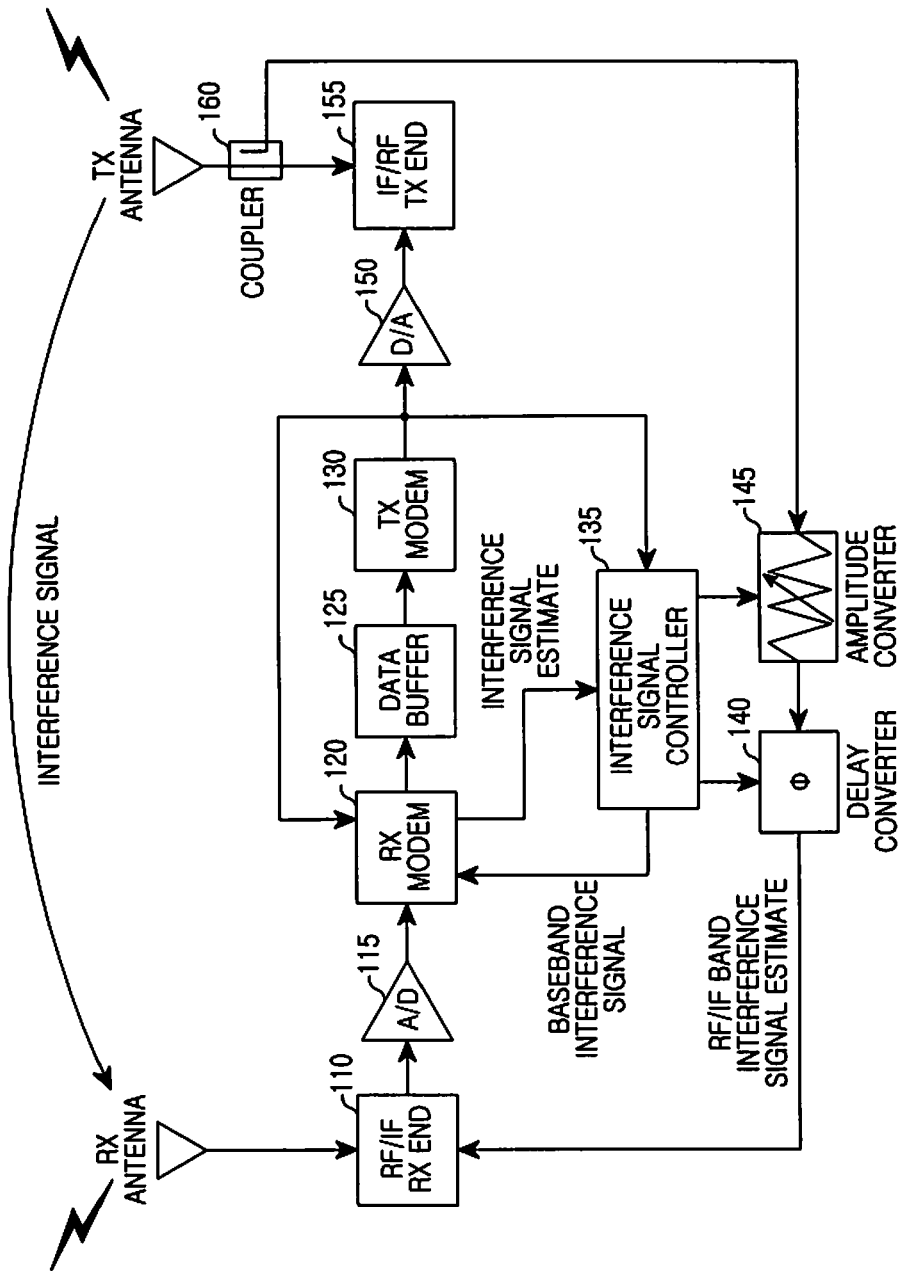
FIG. 1 is a block diagram illustrating a conventional full duplex relay system.
Figure 2:
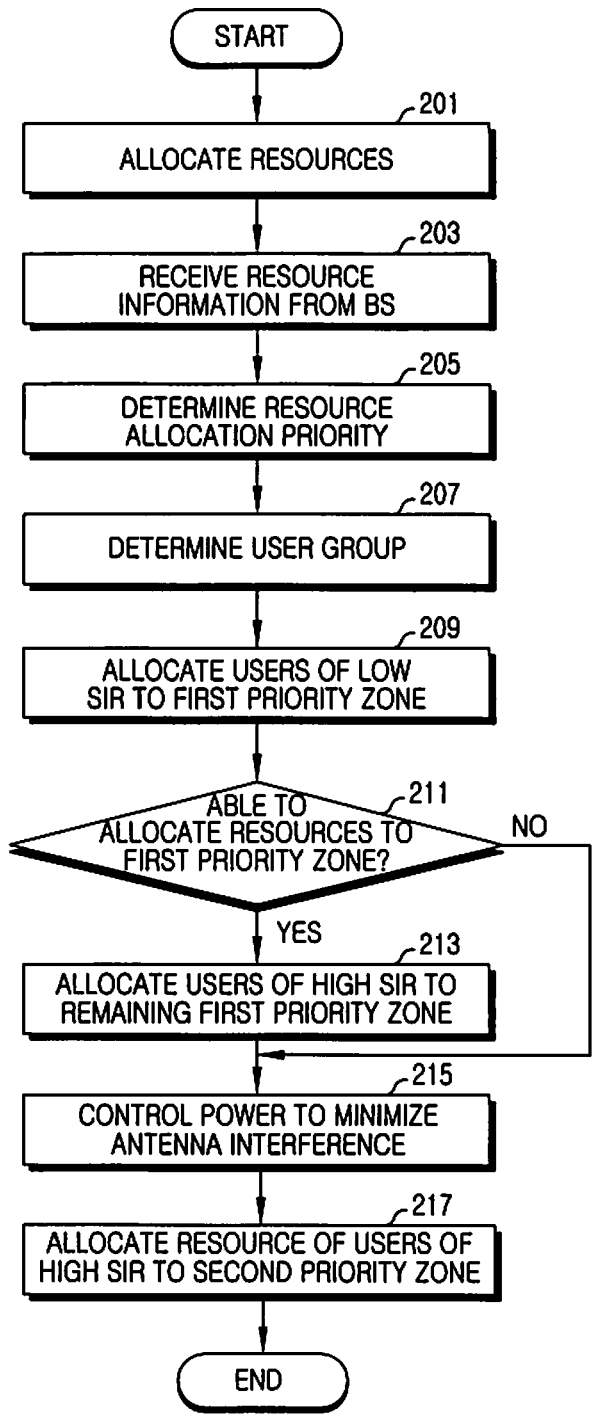
FIG. 2 is a flowchart illustrating a resource allocation method of a relay system according to an embodiment of the present invention.

FIG. 2 is a flowchart illustrating a resource allocation method of a relay system according to an embodiment of the present invention. More specifically, the relay system described in FIG. 2 is a full duplex relay system capable of simultaneous communication with an upper node and a lower node using two antenna sets. A single frame may be constituted regardless of an access link zone and a relay link zone. However, in accordance with an embodiment of the present invention, a zone based frame structure is used to distinguish an access link signal and a relay link signal, such that the relay system can still operate even when a Signal to inter-antenna Interference Ratio (SIR) deteriorates. It is assumed that the relay system is used in a single system environment such as 802.16j system.

Referring to FIG. 2, the relay system allocates resources in step 201. Thereafter, the relay system receives resource information from a Base Station (BS) in step 203. The resource information provided from the BS indicates relay zone information and access zone information. In step 205, the relay system determines a resource allocation priority.

Herein, the resource allocation priority indicates a priority of resource allocation zones to minimize antenna interference when the relay system allocates the resources. For example, when determining that there are not that many users who use the relay system, the relay system allocates the resources first to the access zone that does not experience the inter-antenna interference. However, when there are not enough resources in the access zone to cover the service of all of the users, the relay system allocates additional resources of the relay zone. In the resource allocation priority, the access zone not experiencing the inter-antenna interference is given a first priority and the other relay zone is given a second priority.

In step 207, the relay system determines a group of users that uses the relay system. Herein, the user group is a basis for the resource allocation. The user group includes a sub-group of users meeting a reference SIR (users of the high SIR) and a sub-group of users not meeting the reference SIR (users of the low SIR), which will be described in more detail below with reference to FIG. 14.

The relay system assigns the users of the low SIR to a first priority zone in step 209 and determines whether the resource can be allocated to the first priority zone in step 211. That is, the relay system determines whether or not all of the first priority resources are allocated.

When determining that all of the first priority resources are allocated, the relay system determines that the first priority zone cannot cover the service of all of the users.

Thereafter, the relay system performs a power control process to minimize the inter-antenna interference in step 215 and allocates the remaining resources to the second priority zone in step 217. Herein, the power control process transmits the relay zone resources with a power that is lower than the access zone resources in order to minimize the inter-antenna interference of the relay system, which will be explained in more detail below with reference to FIGS. 6 through 11.

When determining that all of the first priority resources are not allocated in step 211, i.e., when there are sufficient first priority resources, the relay system assigns the user group of the high SIR to the remaining first priority zone in step 213, before performing the power control process to minimize the inter-antenna interference in step 215 and allocating the remaining resources to the second priority zone in step 217.

In summary, in FIG. 2, when all of the resources of the access zone of the first priority and the relay zone of the second priority are used, the terminal of the low SIR is preferentially allocated to the access zone having no interference, according to the SIR level of the terminal.

Figure 3:
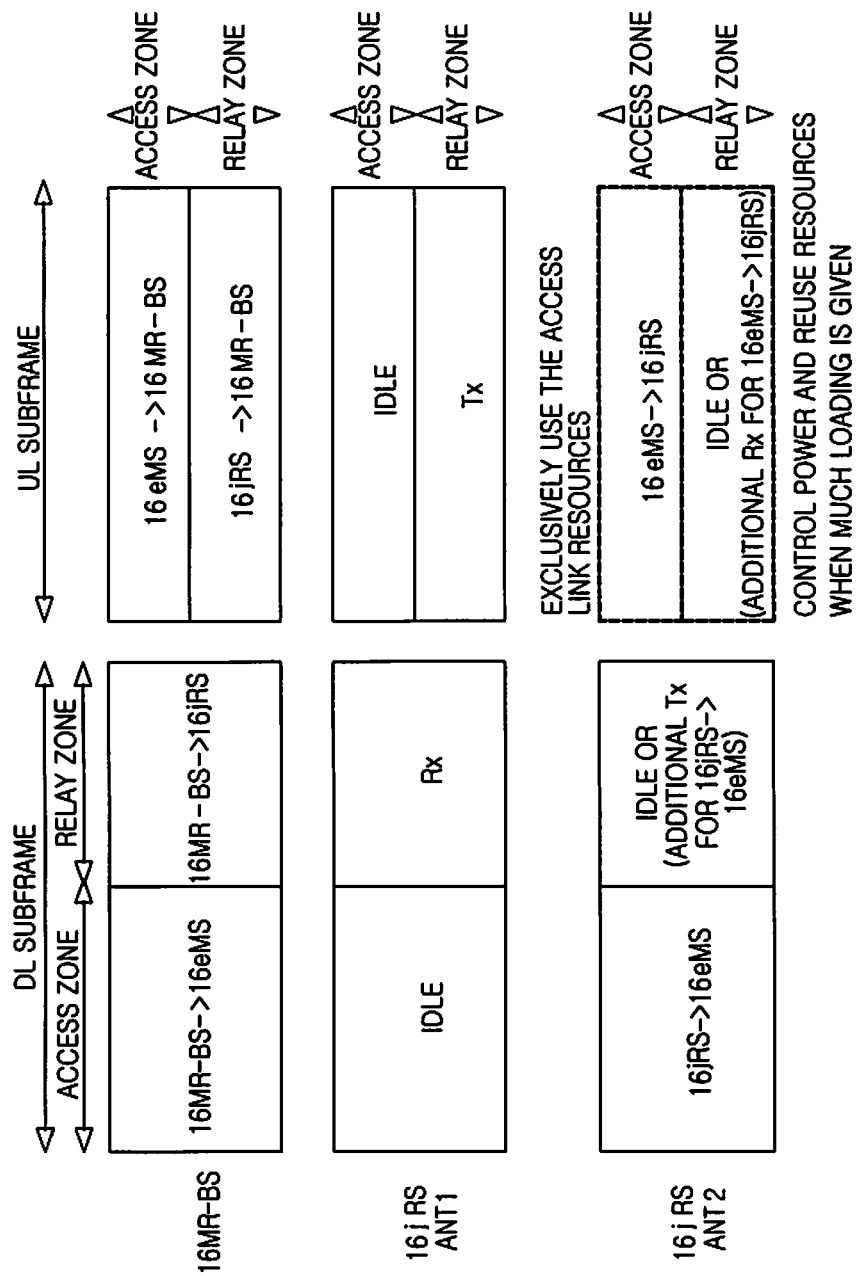
FIG. 3 is a diagram illustrating a frame structure for applying a resource allocation method of a relay system according to an embodiment of the present invention.

FIG. 3 illustrates a frame structure for applying a resource allocation method of a relay system according to an embodiment of the present invention.

Figure 14:
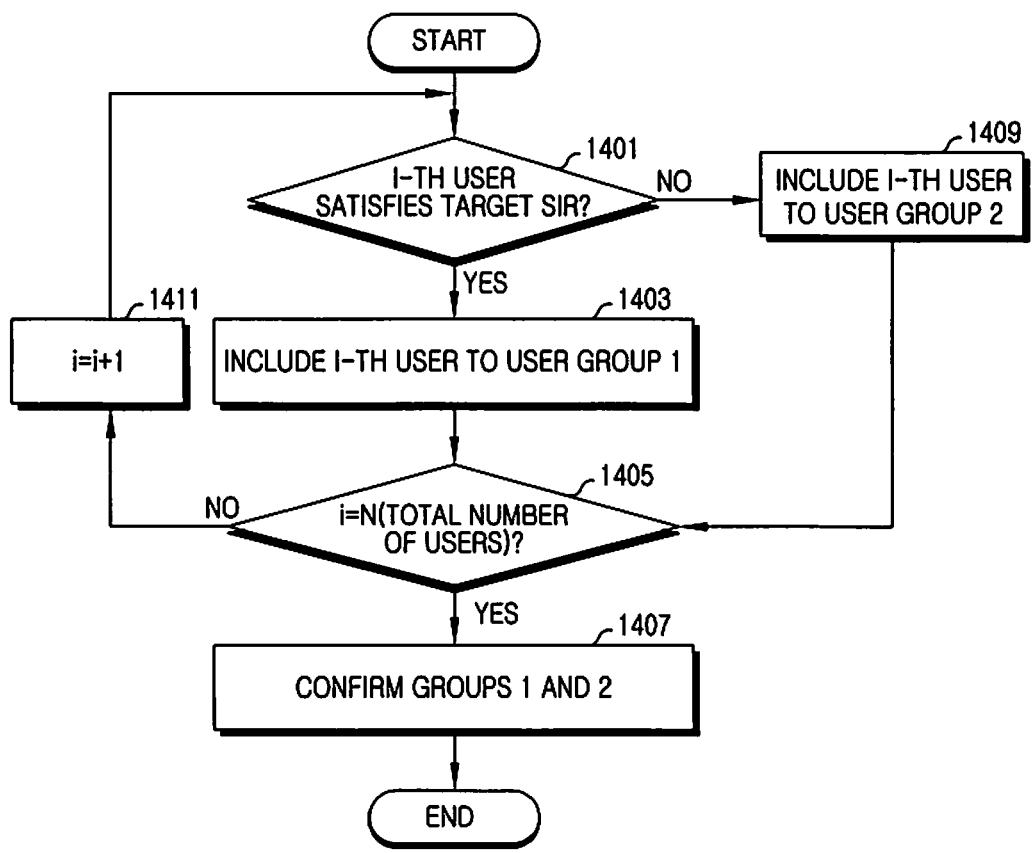
FIG. 14 is a flowchart illustrating a user group determining method of a relay system according to an embodiment of the present invention.

Referring to FIG. 3, in accordance with an embodiment of the present invention, an access zone and a relay zone of an UpLink (UL) interval can be constituted in a Frequency Division Multiplexing (FDM) manner and an access zone and a relay zone of a DownLink (DL) interval can be constituted in a Time Division Multiplexing (TDM) manner. Accordingly, when the relay system allocates the resources, the resource allocation is conducted on the access zone that does not experience the inter-antenna interference. When the resources of the access zone are insufficient for servicing every user, the resources are allocated to the relay zone. Consequently, to minimize the inter-antenna interference, the relay system performs the power control process to transmit the resources of the relay zone with a lower power than the resources of the access zone. The relay system first allocates the user of the low SIR to the access zone according to the user classification based on the SIR as illustrated in FIG. 14.

FIGS. 4A through 4D are flowcharts illustrating a resource allocation method of a relay system according to an embodiment of the present invention. It is assumed that the relay system is used in an environment where a legacy system and a new system coexist, such as 802.16m system. Therefore, the frame structure used by the relay system can form an access sub-zone and a relay sub-zone in a new zone where the new system operates within the 802.16m frame structure. Herein, the DL interval is constituted using the TDM and the UL interval is constituted using the FDM.

Referring to FIGS. 4A through 4D, the relay system allocates resources in step 401. In step 403, the relay system receives the resource information from the BS in step 403. The resource information provided from the BS indicates relay zone information and access zone information.

The relay system determines the amount of resources required for the scheduling in step 405 and determines whether all of the resources may be allocated only to the access zone, i.e., whether all of the resources required for the scheduling can be allocated to the access zone, in step 407.

When all of the resources can be allocated to the access zone in step 407, the relay system allocates all the resources to the access zone in step 409.

However, when all of the resources cannot be allocated to the access zone in step 407, the relay system determines whether the legacy zone is usable in step 410. The legacy zone is used only when the system allows using the legacy zone. When the relay system is not permitted to reuse the resources of the legacy zone, the relay system allocates the resources to the access zone and then to the relay zone.

Figure 4A:
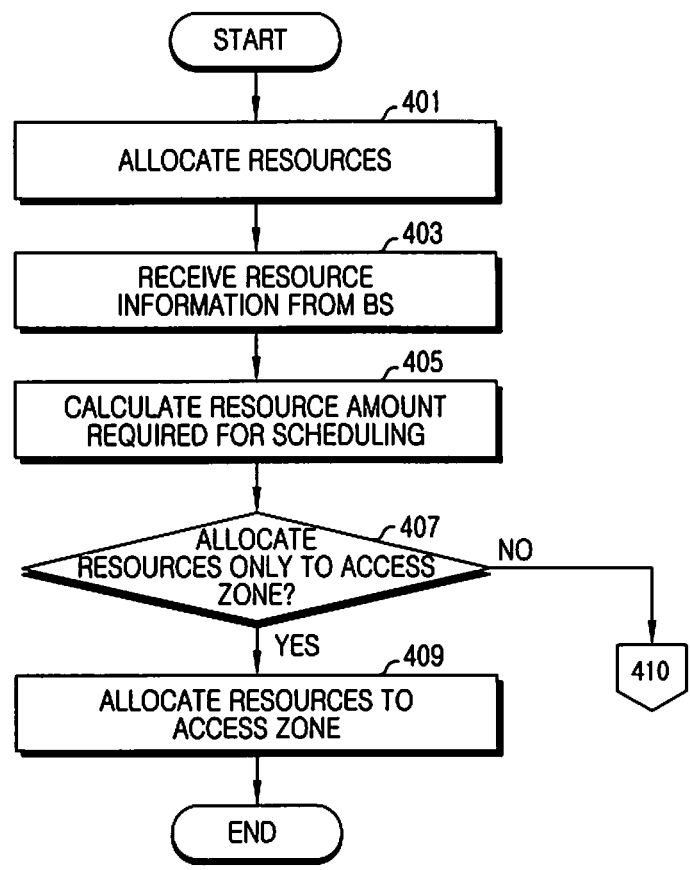
FIGS. 4A through 4D are flowcharts illustrating a resource allocation method of a relay system according to an embodiment of the present invention.
Figure 4B:
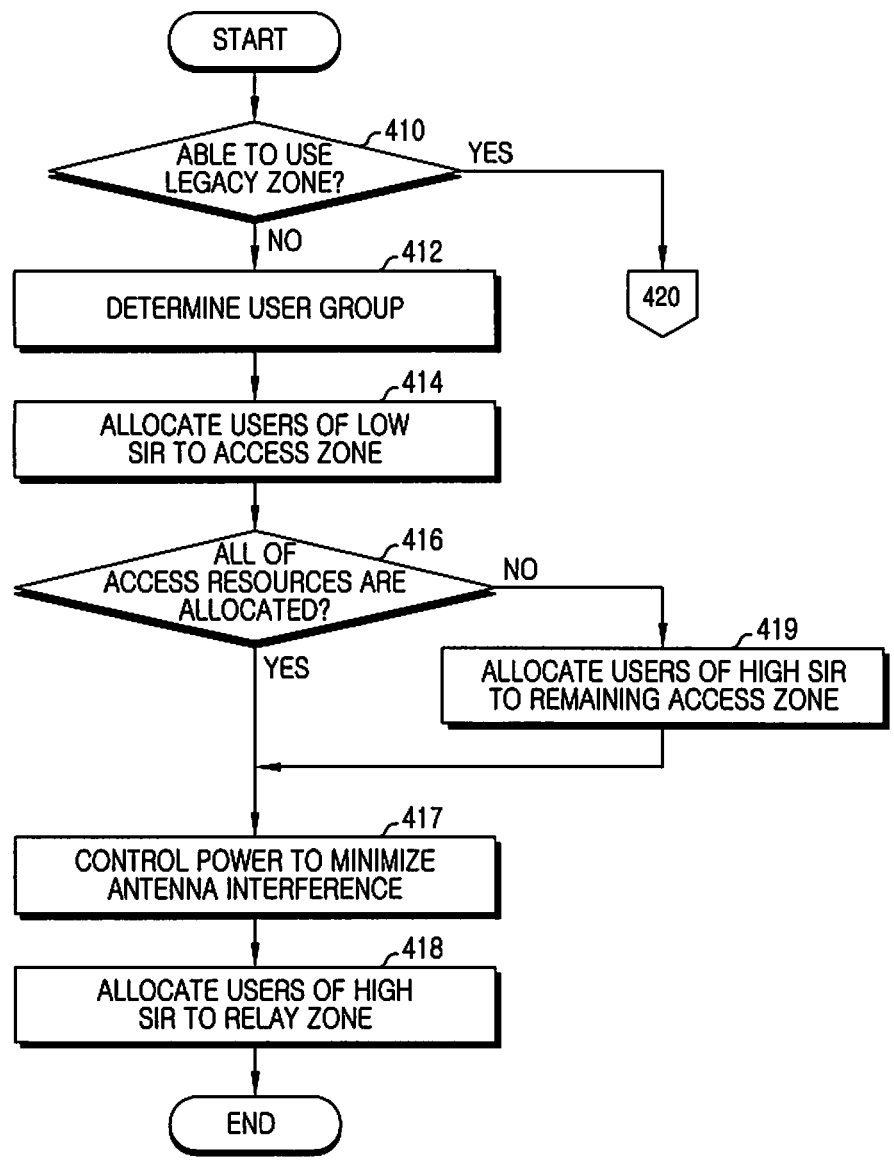

Referring to FIG. 4B, upon determining that the resource allocation to the legacy zone is not possible in step 410, the relay system determines the user group in step 412. Herein, the user group is the basis of the resource allocation. The user group can be divided into a sub-group of users meeting the reference SIR (users of the high SIR) and a sub-group of users not meeting the reference SIR (users of the low SIR).

After assigning the users of the low SIR to the access zone in step 414, the relay system determines whether all of the resources of the access zone are allocated in step 416. That is, the relay system determines whether the users of the low SIR are assigned to all of the access zone resources in step 416.

When the users of the low SIR are not assigned to all of the access zone resources, the relay system allocates the users of the high SIR to the remaining resources of access zone in step 419.

Upon determining that the users of the low SIR are assigned to all of the access zone resources in step 416, the relay system controls the power to minimize the inter-antenna interference in step 417 and allocates the remaining resources to the second priority zone in step 418. Herein, the power control process transmits the resources of the relay zone with the lower power than the resources of the access zone, in order to minimize the inter-antenna interference of the relay system.

When determining that the resource allocation to the legacy zone is possible in step 410, the relay system determines whether all of the resources can be allocated to the access zone and the legacy zone in step 420.

Figure 4C:
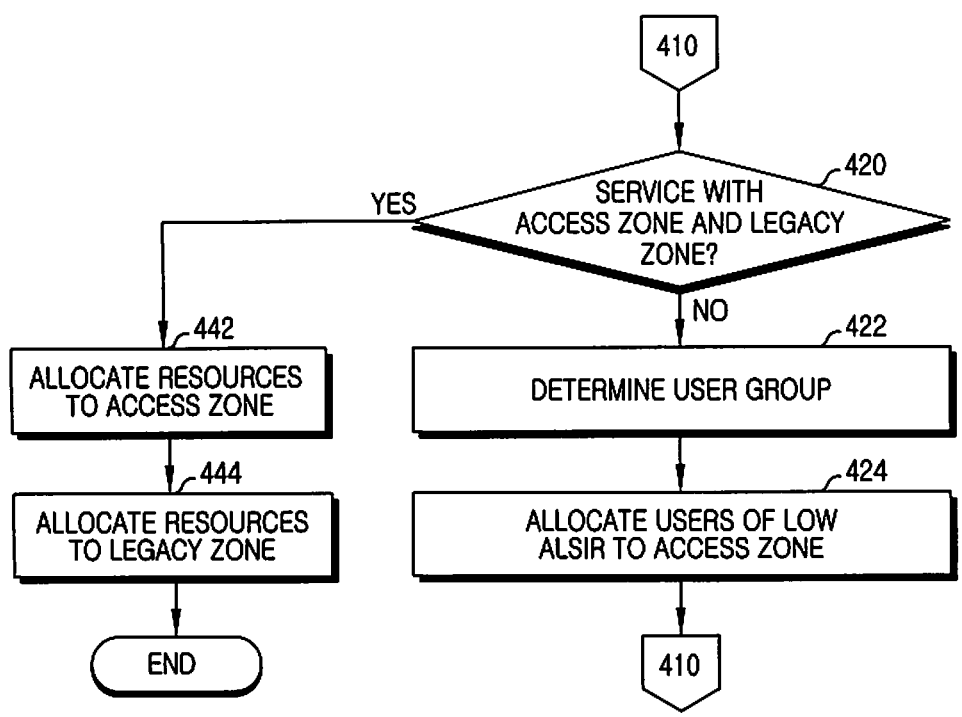

Referring to FIG. 4C, upon determining that all of the resources can be allocated to the access zone and the legacy zone in step 420, the relay system allocates the resources to the access zone in step 442 and allocates the resources to the legacy zone in step 444. Accordingly, the relay system allocates the users of the low SIR to the access zone.

When determining that all of the resources cannot be allocated to the access zone and the legacy zone in step 420, the relay system determines the user group in step 422.

Thereafter, the relay system allocates the users of the low SIR to the access zone in step 424. In step 426, the relay system determines whether all of the access zone resources are allocated.

Figure 4D:
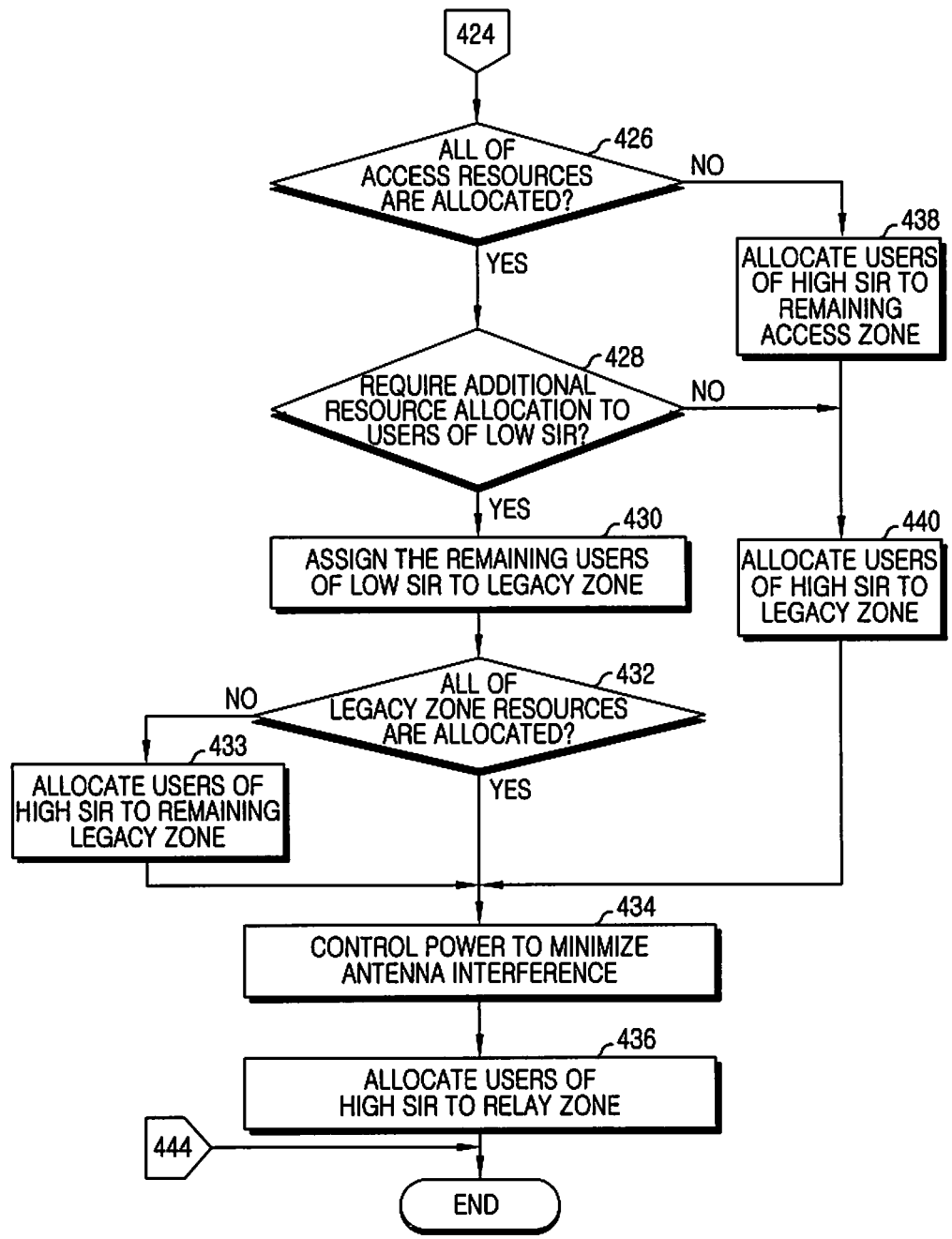

Referring to FIG. 4D, when all of the access zone resources are not allocated in step 426, i.e., when access zone resources remain, the relay system allocates the users of the high SIR to the remaining access zone resources in step 438 and after all of the remaining access source resources are allocated, allocates the remaining users of the high SIR to the legacy zone in step 440.

When all of the access zone resources are allocated in step 426, the relay system determines whether additional resource allocation is required for the users of the low SIR in step 428.

Upon determining that the additional resource allocation is not required for the users of the low SIR in step 428, the relay system allocates the users of the high SIR to the legacy zone in step 440.

Determining that the additional resource allocation is required for the users of the low SIR in step 428, the relay system allocates the remaining users of the low SIR to the legacy zone in step 430 and determines whether all of the legacy zone resources are allocated in step 432.

When all of the legacy zone resources are not allocated in step 432, i.e., when legacy zone resources remain, the relay system allocates the users of the high SIR to the remaining legacy zone in step 433.

When all of the legacy zone resources are allocated in step 432 or following step 433, the relay system controls the power to minimize the inter-antenna interference in step 434 and allocates the remaining resources to the second priority zone in step 436. Herein, the power control process transmits the relay zone resource with the lower power than the access zone resource in order to minimize the inter-antenna interference of the relay system.

Figure 5:
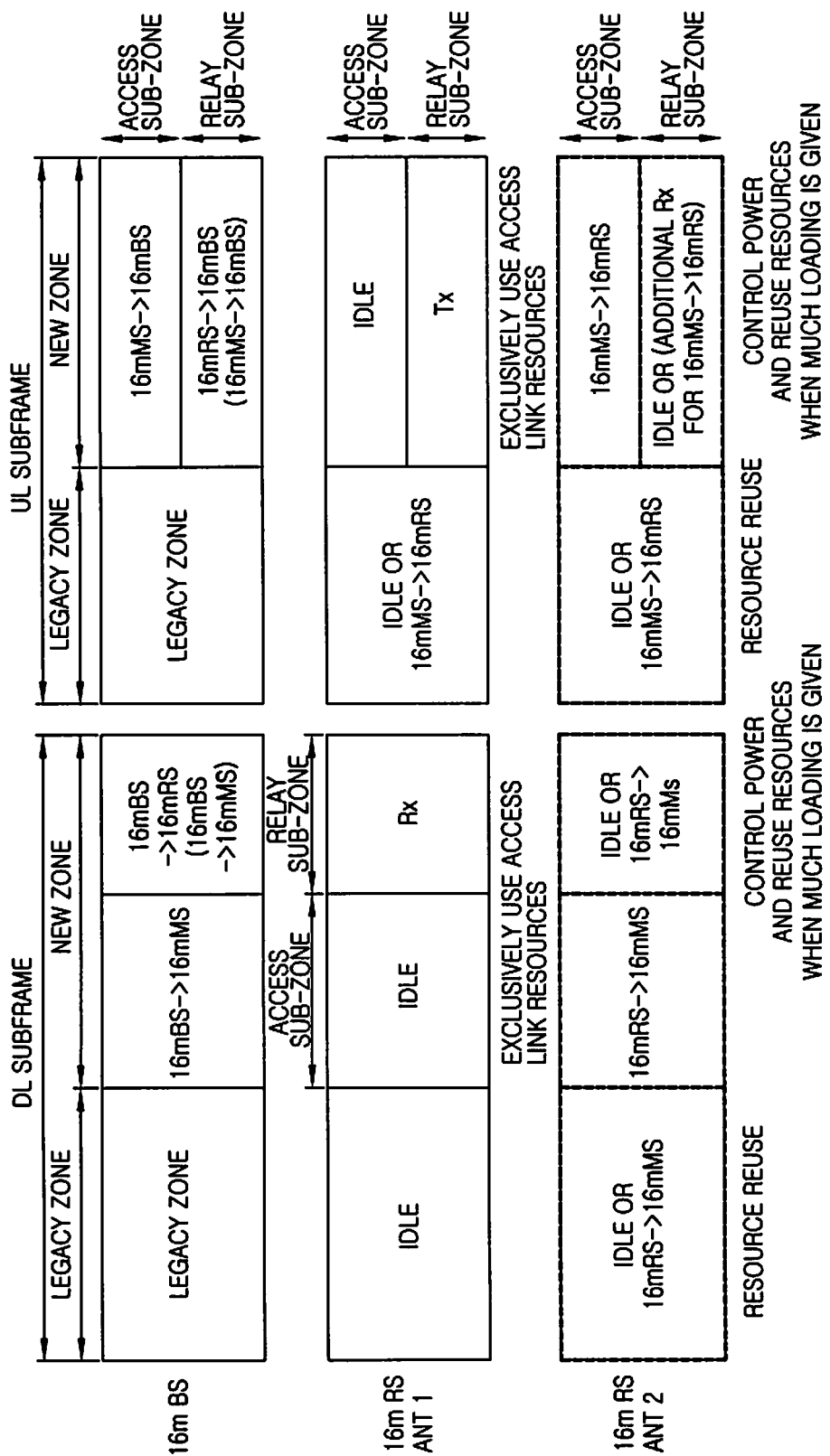
FIG. 5 is a diagram illustrating a frame structure for applying a resource allocation method of a relay system according to an embodiment of the present invention.

FIG. 5 illustrates a frame structure for applying a resource allocation method of a relay system according to an embodiment of the present invention.

Referring to FIG. 5, the DL subframe is divided to a legacy zone and a new zone. Herein, the legacy zone and the new zone of the DL are in the TDM format.

The UL frame is divided to a legacy zone and a new zone. The legacy zone and the new zone of the UL are in the FDM format.

In the frame constituted as above, the legacy zone is reusable as an access link resource of the relay and the resources are allocated in order of the access sub-zone of the new zone, the legacy zone, and the relay zone of the new zone. The reusability of the legacy zone is determined by the system.

Figure 6:
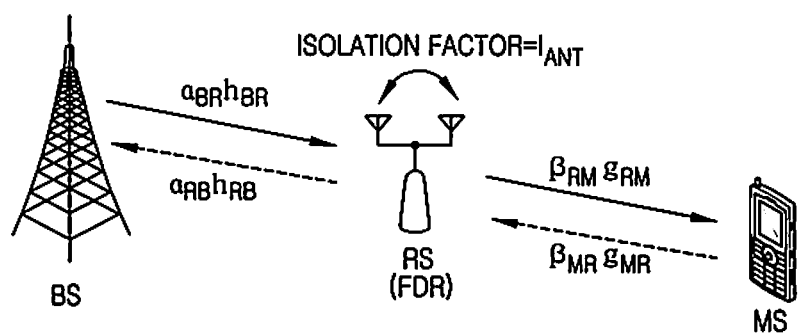
FIG. 6 is a diagram illustrating a power control process in a relay system according to an embodiment of the present invention.

FIG. 6 illustrates a power control process in a relay system according to an embodiment of the present invention.

The power control process of the relay system controls the power of the receive signal or the transmit signal according to an inter-antenna isolation level in order to maintain the inter-antenna reference SIR, which guarantees the stable operation of the interference cancellation performance. Accordingly, the power is controlled by setting a target SIR relying on the interference cancellation performance. The target SIR indicates a reference SIR for the stable operation the interference cancellation function. The target SIR may be different from the scheduling target SIR used for the user classification in the scheduling as described above.

The power control method for satisfying the target SIR includes two schemes: A) a scheme for controlling the original signal; and B) a scheme for controlling the interference signal. In the DL, scheme A) controls the power transmitted from the BS to the relay system, and scheme B) controls the power transmitted from the relay system to the Mobile Station (MS).

In the UL, scheme A) controls the power transmitted from the MS to the relay system and scheme B) controls the power transmitted from the relay system to the BS. Because the power control algorithms are applied in the relay, the power of the relay system is controlled by relay itself in the relay power control and the signaling is performed by generating a power control command of the BS and the MS.

FIG. 6 illustrates parameters used for power control of the relay system, which are as follows:

Antenna isolation factor=$I_{Ant}$

Figure 7:
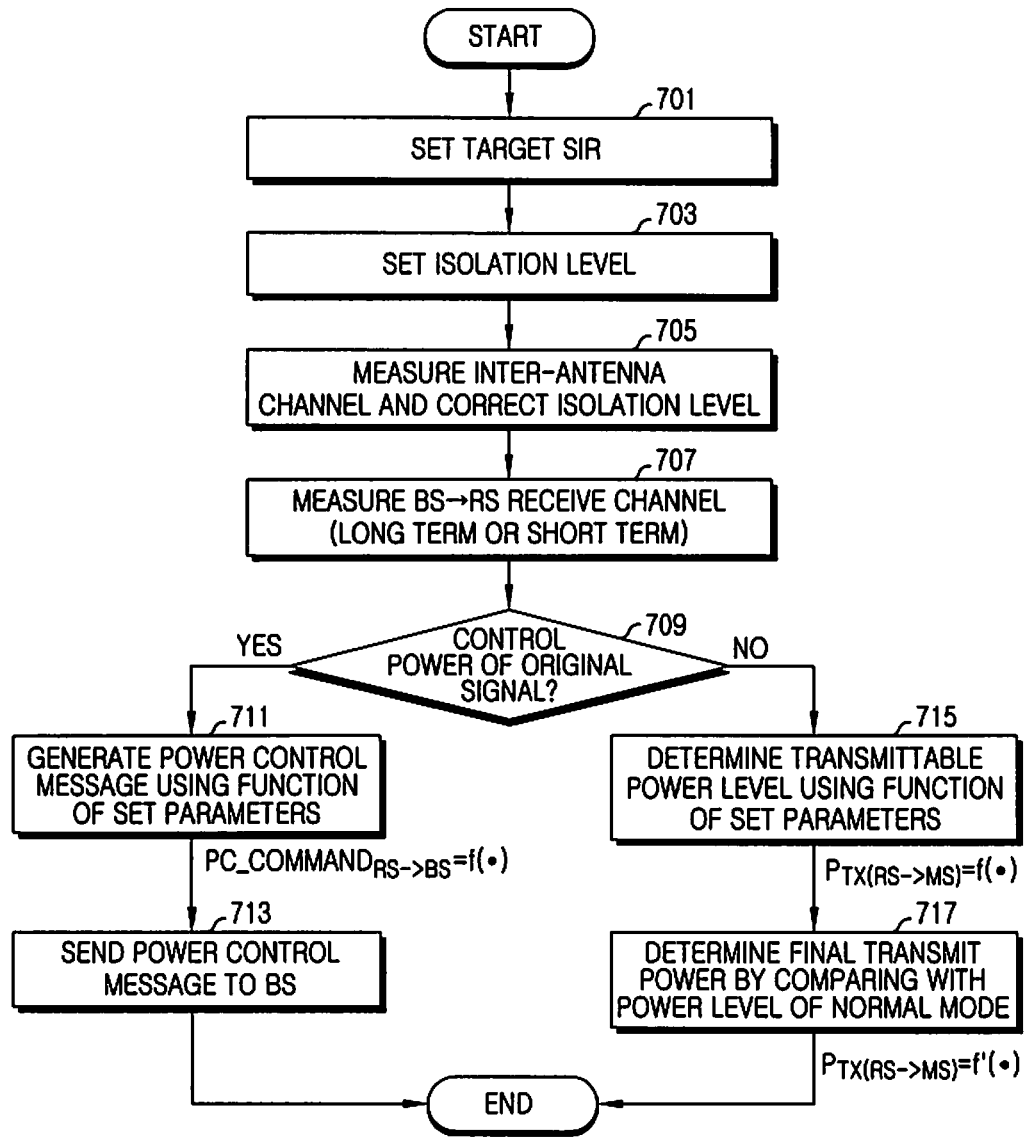
FIG. 7 is a flowchart illustrating a downlink power control method in a relay system according to an embodiment of the present invention.

Long-term channel parameter (pathloss+shadowing)=$\alpha_{BR}$, $\alpha_{RB}$, $\beta_{RM}$, $\beta_{MR}$ Short-term channel parameter (fading)=$h_{BR}$, $h_{RB}$, $g_{RM}$, $g_{MR}$ FIG. 7 is a flowchart illustrating a DL power control method in a relay system according to an embodiment of the present invention. This power control method controls the power of the relay zone to minimize the inter-antenna interference. After setting a target SIR in step 701, the relay system sets an isolation level between the antennas in step 703. In step 705, the relay system measures the channel between the antennas and corrects the isolation level set in step 703.

Herein, the isolation level correction is for more precise power control when the power control is performed by taking into account signal attenuation caused by a fading channel between the two antennas of the relay system. The isolation level can be corrected by correcting an isolation factor using a channel estimate value in the inter-antenna interference cancellation process. Computations using the corrected isolation factor per type can be expressed as follows:

Downlink—Type A $$PC\_Command_{RS \to BS} = f(P_{Tx(RS \to MS)}, I_{Ant}/|\gamma_{21}|^2, SIR_{Target}, P_{Rx(BS \to RS)})$$

Downlink—Type B $$P_{Tx(RS \to BS)} = f(P_{Rx(MS \to RS)}, I_{Ant}/|\gamma_{21}|^2, SIR_{Target})$$

Uplink—Type A $$PC\_Command_{RS \to MS} = f(P_{Tx(RS \to BS)}, I_{Ant}/|\gamma_{12}|^2, SIR_{Target}, P_{Rx(MS \to RS)})$$

Uplink—Type B $$P_{Tx(RS \to BS)} = f(P_{Rx(MS \to RS)}, I_{Ant}/|\gamma_{12}|^2, SIR_{Target})$$

In the computations above, $\gamma_{12}$ is a channel coefficient from the first antenna to the second antenna and $\gamma_{21}$ is a channel coefficient from the second antenna to the first antenna. In the TDD system, $\gamma_{12}$ is equal to $\gamma_{21}$.

The relay system measures the channel of the signal received from the BS in step 707 and determines whether to control the power of the original signal in step 709.

In step 709, the relay system determines whether to control the power with respect to the original signal to control the power of the receive signal, or to control the power with respect to the interference signal to control the interference of the signal received at the relay system, i.e., the power transmitted at the antenna causing the interference of the receive signal.

When determining the power control of the original signal in step 709, the relay system generates a power control message destined for the BS in step 711.

Herein, the power control message requests a level of a receive signal to meet the target SIR set in step 701, and can be expressed using a function $f(\cdot)$ of generating the power control information to meet the target SIR based on Equation (1).

$$PC\_Command_{RS \to BS} = f(P_{Tx(RS \to MS)}, I_{Ant}, SIR_{Target}, P_{Rx(BS \to RS)}) \quad (1)$$

In Equation (1), $P_{Tx(RS \to MS)}$ denotes the power of the signal transmitted by the relay system over the second antenna to service the MS, and $P_{Rx(BS \to RS)}$ denotes the reception level of the signal received at the relay system from the BS, which is measured by the relay system. The measurement value can be applied to a slow power control scheme using the long-term channel measurement value, or to a fast power control scheme using the short-term channel measurement value.

In step 713, the relay system sends the generated power control message to the BS.

However, when determining the power control of the interference signal in step 709, the relay system determines the transmittable power level in step 715 and determines a final transmit power by comparing with the power level of the normal mode in step 717.

The interference signal of the DL affects the signal received from the BS (the signal transmitted to the MS). The power control message destined for the BS is not generated. Instead, the power value required to control the interference of the relay system is directly determined and applied to the transmit signal.

The power value required to control interference is given by Equation (2).

$$P_{Tx(RS \to MS)} = f(P_{Rx(BS \to RS)}, I_{Ant}, SIR_{Target}) \quad (2)$$

In Equation (2), $f(\cdot)$ denotes a function of determining the power control value using three given parameters. The $P_{Rx(BS \to RS)}$ measurement value can be applied to the slow power control scheme using the long-term channel measurement value or to the fast power control scheme using the short-term channel measurement value.

The relay system determines the final transmit power value by inputting the power control value computed as above and the downlink power control value of the normal mode to the function expressed as Equation (3).

$$P_{Tx(RS \to MS)} = f'(P_{Tx(RS \to MS)}, P_{Req\_RS\_Normal}) \quad (3)$$

In Equation (3), $f'(\cdot)$ denotes a final transmit power value using the downlink power control value of the normal mode and the power control value determined based on Equation (2) as its input.

Figure 8:
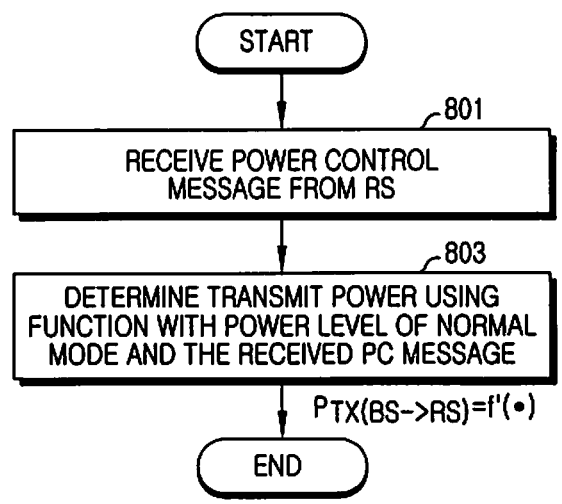
FIG. 8 is a flowchart illustrating operations of a base station for a power control process according to an embodiment of the present invention.

FIG. 8 is a flowchart illustrating power control operations of a BS according to an embodiment of the present invention, particularly, when an original signal power is controlled in a DL.

Referring to FIG. 8, the BS receives the power control message from the relay system in step 801 and determines the final transmit power level by combining the result of the power control process in the normal mode and the result of the power control process received from the relay system in step 803. The power control method in the normal mode can vary and shall be omitted here.

The BS, after receiving the power control message from the relay system, determines the final transmit power level based on Equation (4).

$$P_{Tx(BS \to RS)} = f'(PC\_command_{RS \to BS}, P_{Req\_BS\_Normal}) \quad (4)$$

In Equation (4), $f'(\cdot)$ denotes a function of determining the final power level by incorporating the power control result of the normal mode and the request information from the relay system.

Figure 9:
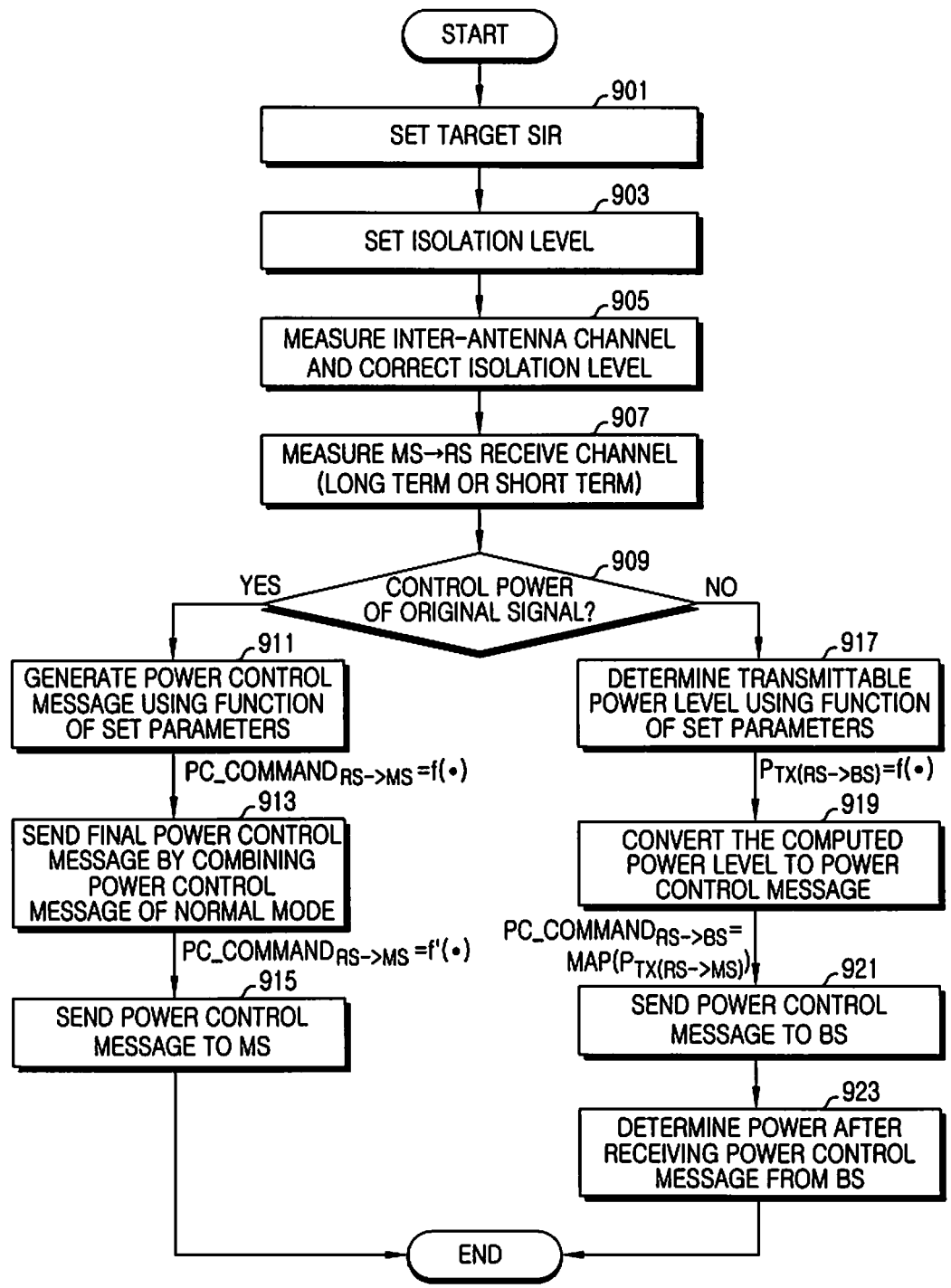
FIG. 9 is a flowchart illustrating an uplink power control method in a relay system according to an embodiment of the present invention.

FIG. 9 is a flowchart illustrating an uplink power control method of a relay system according to an embodiment of the present invention.

Referring to FIG. 9, the relay system sets a target SIR in step 901 and sets an isolation level between antennas in step 903.

In step 905, the relay system measures the channel between the antennas and corrects the isolation level defined in step 903. The relay system measures the channel of the signal received from the MS in step 907 and determines whether to control the power of the original signal in step 909.

More specifically, in step 909, the relay system determines whether to control the power of the original signal to regulate the power of the MS as the signal received from the MS is the original signal, or to control the power of the interference signal to regulate the power of the signal transmitted to the BS via the antennas to control the signal transmitted to the BS which is the interference of the signal received from the MS.

When determining the power control of the original signal in step 909, the relay system generates the power control message destined for the MS in step 911.

Herein, the power control message requests the level of the receive signal to meet the target SIR defined in step 901, and is given by Equation (5).

$$PC\_Command_{RS \to MS} = f(P_{Tx(RS \to BS)}, I_{Ant}, SIR_{Target}, P_{Rx(MS \to RS)}) \quad (5)$$

In Equation (5), $P_{Tx(RS \to BS)}$ is the power of the signal transmitted from the relay system to the BS, and $P_{Rx(MS \to RS)}$ is the magnitude of the signal received at the relay system from the MS, which is to be measured by the relay system. The measurement value can employ the slow power control scheme using the long-term channel measurement value or the fast power control scheme using the short-term channel measurement value.

In step 913, the power control request generates a final power control command by combining the power control request of the normal mode and the generated power control request based on Equation (6).

$$PC\_Command_{RS \to MS} = f'(PC\_Command_{RS \to MS}, PC_{Req\_RS\_Normal}) \quad (6)$$

In Equation (6), $f'(\cdot)$ denotes a function of determining the final power control command by incorporating the power control command generated by considering the target SIR and the power control command of the normal mode.

Next, the relay system sends the generated final power control message to the MS in step 915.

However, when determining the power control on the interference signal in step 909, the relay system generates the power control message to transmit to the BS that controls the power of the uplink. In step 917, the relay system determines the power control value using the function for satisfying the target SIR based on Equation (7).

$$P_{Tx(RS \to BS)} = f(P_{Rx(MS \to RS)}, I_{Ant}, SIR_{Target}) \quad (7)$$

In Equation (7), $f(\cdot)$ denotes a function of determining the final power control level by incorporating the power control result of the normal mode and the request information from the relay system.

In step 919, the relay system transforms the determined power control value to a message destined for the BS using a mapping function of Equation (8).

$$PC\_Command_{RS \to BS} = Map(P_{Tx(RS \to BS)}) \quad (8)$$

In Equation (8), $Map(\cdot)$ denotes a mapping function for transforming the determined power control value to the power control message.

The relay system sends the generated message to the BS in step 921 and controls the power according to a received the power control message from the BS in step 923.

Figure 10:
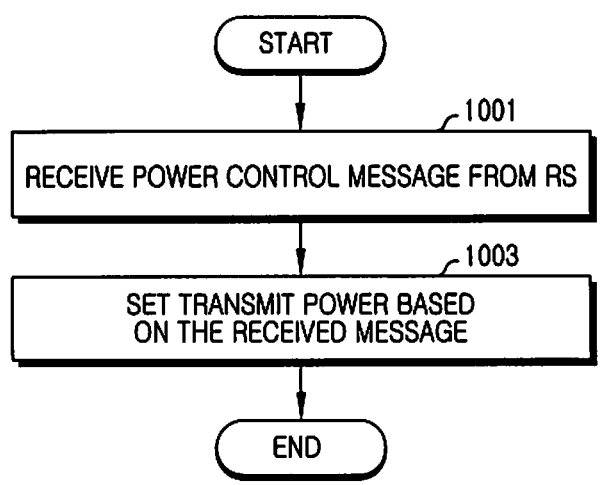
FIG. 10 is a flowchart illustrating operations of a mobile station for a power control process according to an embodiment of the present invention.

FIG. 10 is a flowchart illustrating power control operations of an MS in a UL according to an embodiment of the present invention.

Referring to FIG. 10, the MS receives the power control message from the relay system in step 1001 and controls the transmit power according to the received power control message in step 1003.

Figure 11:
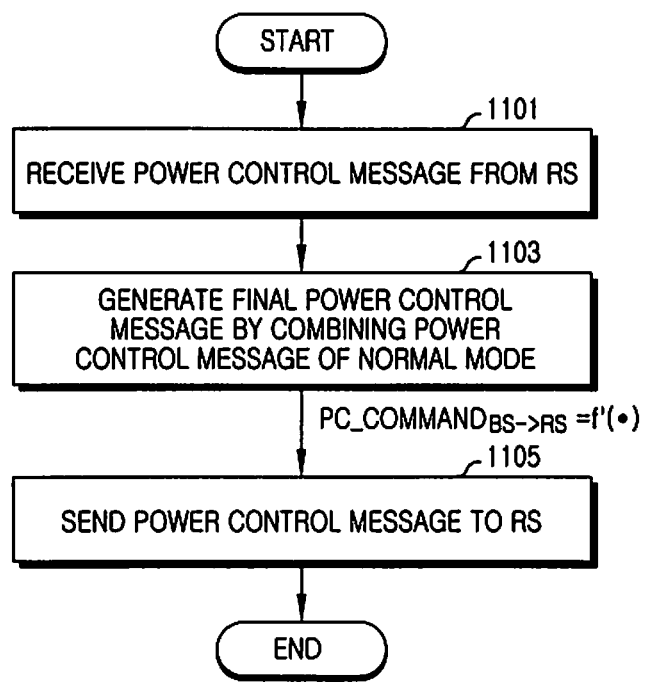
FIG. 11 is a flowchart illustrating operations of a base station for a power control process according to an embodiment of the present invention.

FIG. 11 is a flowchart illustrating power control operations of a BS in a UL according to an embodiment of the present invention.

Referring to FIG. 11, the BS receives the power control message from the relay system in step 1101 and generates the final power control message by combining the power control message of the normal mode and the power control message received from the relay system in step 1103.

The BS generates the final power control message based on Equation (9).

$$PC\_Command_{BS \to RS} = f'(PC\_Command_{BS \to BS}, PC_{Req\_BS\_Normal}) \quad (9)$$

In Equation (9), $f'(\cdot)$ denotes a function for determining the final power control command by incorporating the power control command generated by considering the target SIR and the power control command of the normal mode.

Next, the BS sends the generated final power control message to the relay system in step 1105.

For the power control process, the relay system measures the power control parameters based on Equation (10).

Downlink—Type A $$PC\_Command_{RS \to BS} = f(P_{Tx(RS \to MS)}, I_{Ant}/|\gamma_{21}|^2, SIR_{Target}, P_{Rx(BS \to RS)})$$

Downlink—Type B $$P_{Tx(RS \to BS)} = f(P_{Rx(MS \to RS)}, I_{Ant}/|\gamma_{21}|^2, SIR_{Target})$$

Uplink—Type A $$PC\_Command_{RS \to MS} = f(P_{Tx(RS \to BS)}, I_{Ant}/|\gamma_{12}|^2, SIR_{Target}, P_{Rx(MS \to RS)})$$

Uplink—Type B $$P_{Tx(RS \to BS)} = f(P_{Rx(MS \to RS)}, I_{Ant}/|\gamma_{12}|^2, SIR_{Target}) \quad (10)$$

As described above, in the power control on the original signal or on the interference signal, the relay system performs the slow power control scheme based on the long-term channel statistic that lengthens the measurement interval of the necessary receive signal measurement parameters and performs the fast power control scheme based on the short-term channel statistic that shortens the measurement interval of the receive signal measurement parameters.

The slow power control scheme measures the receive signal in consideration of only the path loss and the shadowing, which are the long-term channel characteristics, by lengthening the receive signal measurement interval.

The fast power control scheme measures the receive signal in consideration of the path loss and the shadowing, which are the long-term channel characteristics, and also the short-term fading, by shortening the receive signal measurement interval.

While the receive signal measurement parameters of the relay system can be the channel power measurement value of the receive signal based on the channel estimation, to simplify the implementation, they may be a Received Signal Strength (RSS), which is the power measurement value of the receive signal.

Figure 12:
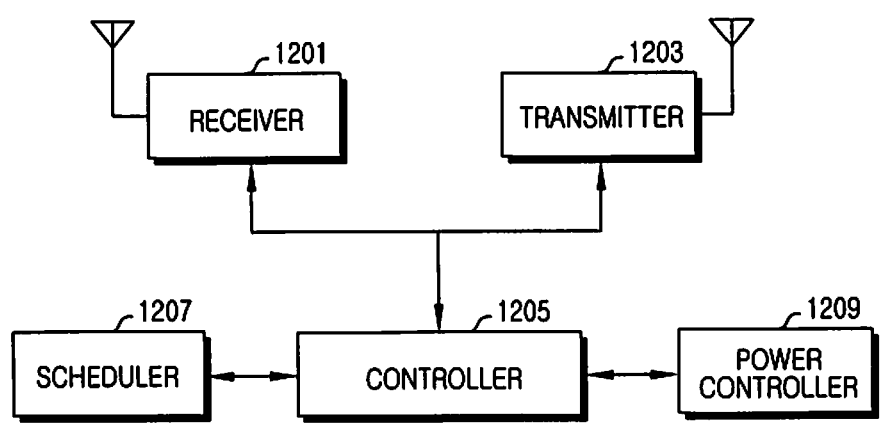
FIG. 12 is a block diagram illustrating a relay system according to an embodiment of the present invention.

FIG. 12 is a block diagram illustrating a relay system according to an embodiment of the present invention.

Referring to FIG. 12, the relay system includes a receiver 1201, a transmitter 1203, a controller 1205, a scheduler 1207, and a power controller 1209.

The receiver 1201 and the transmitter 1203 receive information for measuring the parameters required for the resource allocation of the relay system, and transmit or receive the message required for the power control. The controller 1205 controls the resource allocation process and the power control process of the relay system. The scheduler 1207 determines the resource allocation priority in the resource allocation.

Upon determining that there are not that many users of the relay system, the scheduler 1207 allocates the resource to the zone of the high priority, i.e., to the access zone, which is the zone without the inter-antenna interference. When determining that there are many users in the relay system, the scheduler 1207 allocates the resource to the next priority zone, i.e., to the relay zone. When detecting a user that does not meet the target SIR, the scheduler 1207 assigns the user first to the zone that does not experience the interference.

When the scheduler 1207 allocates the resource to the relay zone that can experience the inter-antenna interference, the power controller 1209 minimizes the inter-antenna interference through the lower power control in the access zone.

Applications of the power control process on the original signal of the downlink and the power control process on the interference signal of the uplink in the relay system will now be described below.

1. Set the Target SIR

Figure 13:
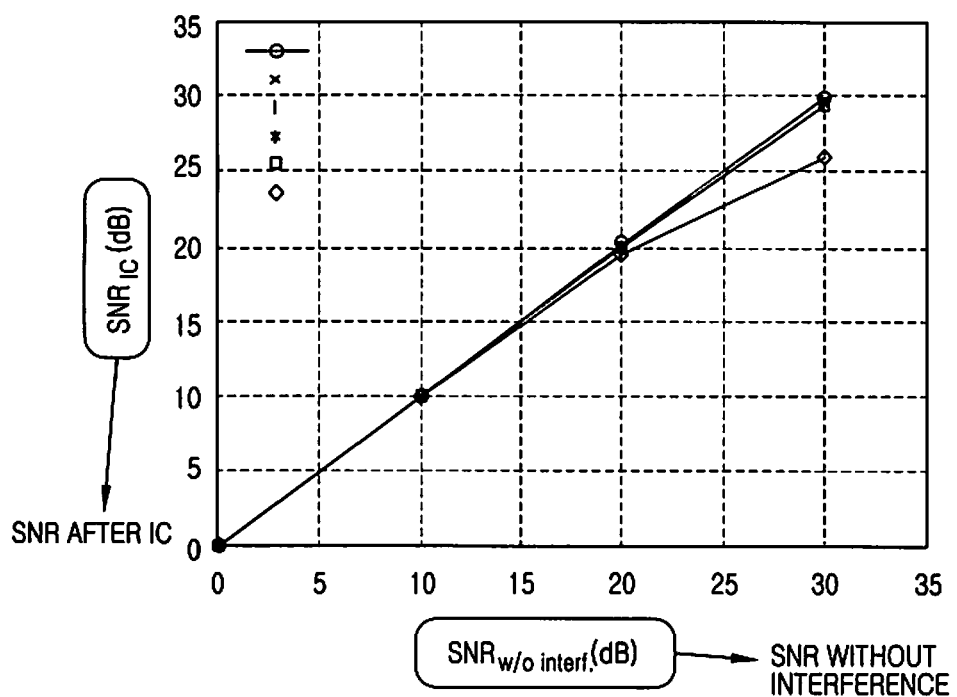
FIG. 13 is a graph illustrating performance of a relay system according to an embodiment of the present invention.

The target SIR for the stable inter-antenna interference cancellation can be determined based on the operation performance of the interference cancellation algorithm and the allowable performance degradation degree. Herein, when the interference is rejected using an adaptive filter in a Single-Input Single-Output (SISO) environment, the performance is achieved as illustrated in FIG. 13. The target SIR is set to SIR=−40 dB incurring no considerable performance degradation of the antenna interference cancellation (the performance degradation within 0.5 dB) around 25 dB in consideration of the link adaptation range of the general mobile communication system.

2. Set the Inter-Antenna Isolation Level

Because the inter-antenna isolation level varies depending on the installation environment of the full duplex relay system, the operator should properly set the inter-antenna isolation level in accordance with the installation environment. In accordance with an embodiment of the present invention, two antennas form sector antennas and the isolation level is set to 80 dB obtainable when the vertical distance between the antennas is 1.5 m. This value does not take into account of the isolation characteristics obtainable with the regional characteristics. In the installation environment for the subway or the underground, a greater isolation level can be ensured.

3. Control the Downlink Power

The present invention provides the power control method without taking into account the inter-antenna fading channel. According to the downlink power control of the type A, the relay system measures the receive signal level from the BS and directly determines the power of the signal transmitted over the second antenna based on Equation (11):

$$P_{Tx(RS \to MS)} = f(P_{Rx(BS \to RS)}, I_{Ant}, SIR_{Target}) \Leftrightarrow P_{Tx(RS \to MS)} = \qquad (11)$$

$$P_{Rx(BS \to RS)} + \frac{I_{Ant}}{80 \text{ dB}} - \frac{SIR_{Target}}{-40 \text{ dB}} \text{ (dB)}.$$

In the above simplified Equation (11), $f(\cdot)$ determines the transmit power to meet the target SIR without other considerations or weights. The receive signal level measurement value from the BS can employ either the short-term scheme or the long-term scheme. The final transmit power is determined by combining the determined value and the transmit power of the normal mode. In accordance with an embodiment of the present invention, the environment where the fixed power of 30 dBm is transmitted in the normal mode is considered. In this situation, the final transmit power can be determined using the determined power value and the normal mode transmit power value as shown in Equation (12):

$$P_{Tx(RS \to MS)} = f'(P_{Tx(RS \to MS)}, P_{Req\_RS\_Normal}) \Leftrightarrow P_{Tx(RS \to MS)} = \qquad (12)$$

$$\text{Min}\left(P_{Tx(RS \to MS)}, \frac{P_{Req\_RS\_Normal}}{30 \text{ dBm for fixed power case}}\right) \text{ (dB)}$$

In Equation (12), $f'(\cdot)$ determines the final transmit power as a minimum value of the determined transmit power and the transmit power value of the normal mode. In the DL power control as above, the transmit powers of the relay system based on the receive signal level of the relay system are shown Table 1.

TABLE 1

| Target SIR | Isolation | BS Signal Power @ Relay Rx | Calculated Relay Tx. Power | Actual Tx Power | Actual SIR |
|---|---|---|---|---|---|
| −40 dB | 80 dB | −60 dBm | 60 dBm | 30 dBm | −10 dB |
|  |  | −70 dBm | 50 dBm | 30 dBm | −20 dB |
|  |  | −80 dBm | 40 dBm | 30 dBm | −30 dB |
|  |  | −90 dBm | 30 dBm | 30 dBm | −40 dB |
|  |  | −100 dBm | 20 dBm | 20 dBm | −40 dB |
|  |  | −110 dBm | 10 dBm | 10 dBm | −40 dB |

4. Control the Uplink Power

An embodiment of the present invention provides the power control method without considering the inter-antenna fading channel. The uplink power control of the type B measures the receive signal level from the MS and signals the power control command to the MS so that the receive signal power of the MS satisfies the target SIR. By taking into account the target SIR, the power control command can be generated as shown below in Equation (13):

$$PC\_Command_{RS \to MS} = \qquad (13)$$

$$f(P_{Tx(RS \to BS)}, I_{Ant}, SIR_{Target}, P_{Rx(MS \to RS)}) \Leftrightarrow PC\_Command_{RS \to MS} =$$

$$\begin{cases} 1 & \text{if } P \geq P_{Rx(MS \to RS)} \\ 0 & \text{if } P < P_{Rx(MS \to RS)} \end{cases}$$

$$\text{where } P = P_{Tx(RS \to BS)} - I_{Ant} + SIR_{Target}$$

When the current signal level received from the MS is lower than the power determined to meet the target SIR, Equation (13) generates the message '1'. When the signal level is higher than the determined power, Equation (13) generates the message '0'. '1' is the command instructing to increase the power of the MS and '0' is the command instructing to maintain or decrease the power of the MS. The message format for the commands can vary, and the above Equation (13) is a mere example.

The final power control command is generated by incorporating the power control message generated by considering the target SIR and the power control command of the normal mode as shown in Equation (14):

$$P_{Tx(BS \to RS)} = \qquad (14)$$

$$\frac{f'(PC\_Command_{RS \to BS}, P_{Req\_BS\_Normal}) \Leftrightarrow PC\_Command_{RS \to MS} =}{OR(PC\_Command_{RS \to MS}, PC_{Req\_BS\_Normal})}$$
determine as 1 when one or both
of normal power control mode result and
FDRoperation power control mde result is 1

In Equation (14), when one or both of the power control command determined by considering the target SIR and the power control command generated in the normal power control mode is the 'power increase' command, f'(·) is the OR function of setting the final power control message to 'power increase'. In the equation, OR(·) is a function which outputs '1' when one of two input parameters is '1' and both of two input parameters are '1', and outputs '0' when both of the input parameters are '0'.

FIG. 14 is a flowchart illustrating a user group determining method of a relay system according to an embodiment of the present invention.

Referring to FIG. 14, in step 1401, the relay system examines the target SIR with respect to the i-th user. When the i-th user does not satisfy the reference target SIR in step 1401, the relay system includes the user to the user group 2 (the user group of the low SIR) in step 1409.

When the i-th user satisfies the reference target SIR in step 1401, the relay system includes the user to the user group 1 (the user group of the high SIR) in step 1403 and determines whether the target SIR of every user is examined in step 1405.

When not examining the SIR of every user in step 1405, the relay system increases the i-th user in step 1411. That is, the relay system repeats this procedure until the SIR of every user is examined.

In step 1407, the relay system determines the users of the user group 1 and the user group 2.

As described above, a relay system in accordance with an embodiment of the present invention allocates a resource first to a zone that does not experience inter-antenna interference in a resource allocation, allocates resources to a zone experiencing the interference in an additional resource allocation, and minimizes the interference through power control. Accordingly, the full duplex relay system operates even when sufficient isolation between the antennas is not ensured, and the resources are effectively managed in accordance with a load condition of the relay system. Ultimately, the system capacity may be enhanced by virtue of the full duplex relay structure without the restriction on the installation environment.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for a relay station including a plurality of antennas, the apparatus comprising:
at least one transceiver;
a scheduler configured to, if a number of terminals performing a communication with the relay station does not exceed a determined amount, allocate resources to a first zone for the communication, and if the number of terminals performing the communication with the relay station exceeds the determined amount, allocate the resources to a second zone for the communication; and
a power controller configured to determine a first power of a first signal or a second power of a second signal in the second zone based on a predetermined signal to inter-antenna interference ratio (SIR) and a predetermined isolation level between a first antenna of the relay station and the second antenna of the relay station,
wherein the first zone has a lower inter-antenna interference between antennas than the second zone,
wherein the inter-antenna interference indicates an interference between the first antenna and the second antenna, and
wherein the inter-antenna interference results from the first signal which is transmitted from the first antenna and is received through the second antenna while the relay station receives the second signal from a terminal or an upper node using the second antenna.

2. The apparatus of claim 1, wherein when there are not enough resources in the first zone to service a terminal, the scheduler allocates resources to the second zone.

3. The apparatus of claim 1, wherein the power controller is further configured to set a lower power to the second zone than to the first zone.

4. The apparatus of claim 1, wherein the scheduler is further configured to determine SIR values of terminals and allocate the terminals having relatively low SIR values to the first zone.

5. The apparatus of claim 1, wherein the power controller is further configured to generate a message for controlling the second power; and wherein the transceiver is further configured to transmit the message to the terminal or to the upper node, which transmits the second signal.

6. The apparatus of claim 1, wherein the power controller is further configured to generate a message for controlling the first power; and wherein the transceiver is further configured to transmit the message to the upper node.

7. The apparatus of claim 1, the transceiver is further configured to measure a channel between the first antenna and the second antenna,
wherein the channel measurement is used to update the predetermined isolation level.

8. A method for operating a relay station including a plurality of antennas, the method comprising:
if a number of terminals performing a communication with the relay station does not exceed a determined amount, allocating resources to a first zone for the communication; and
if the number of terminals performing the communication with the relay station exceeds the determined amount, allocating the resources to a second zone for the communication;
determining a first power of a first signal or a second power of a second signal in the second zone based on a predetermined signal to inter-antenna interference ratio (SIR) and a predetermined isolation level between a first antenna of the relay station and the second antenna of the relay station,
wherein the first zone has a lower inter-antenna interference between antennas than the second zone,
wherein the inter-antenna interference indicates an interference between the first antenna and the second antenna, and
wherein the inter-antenna interference results from the first signal which is transmitted from the first antenna and is received through the second antenna while the relay station receives the second signal from a terminal or an upper node using the second antenna.

9. The method of claim 8, further comprising:
when the resources of the first zone are insufficient to service a terminal, allocating resources to the second zone.

10. The method of claim 8, further comprising:
setting a lower power to the second zone than to the first zone.

11. The method of claim 8, further comprising:
determining SIR values of terminals and allocating the terminals having relatively low SIR values to the first zone.

12. The method of claim 8; further comprising:
generating a message for controlling the second power; and
transmitting the message to the terminal or to the upper node, which transmits the second signal.

13. The method of claim 8, further comprising:
generating a message for controlling the first power; and
transmitting the message to the upper node.

14. The method of claim 8, further comprising:
measuring a channel between the first antenna and the second antenna,
wherein the channel measurement is used to update the predetermined isolation level.

* * * * *